United States Patent
Knutson et al.

(10) Patent No.: US 6,844,805 B2
(45) Date of Patent: Jan. 18, 2005

(54) TEMPERATURE DETECTION AND SWITCHING ASSEMBLY

(75) Inventors: Martin J. Knutson, Coon Rapids, MN (US); Kent S. Delahay, Plymouth, MN (US); Mark W. Garfield, Ham Lake, MN (US); Mark J. Swenson, Ramsey, MN (US); Jon S. Shogren, Ham Lake, MN (US)

(73) Assignee: Minco Products, Inc., Minneapolis, MN (US)

( * ) Notice: Subject to any disclaimer, the term of this patent is extended or adjusted under 35 U.S.C. 154(b) by 0 days.

(21) Appl. No.: 10/334,084

(22) Filed: Dec. 30, 2002

(65) Prior Publication Data

US 2003/0141956 A1 Jul. 31, 2003

Related U.S. Application Data

(60) Provisional application No. 60/343,989, filed on Jan. 2, 2002.

(51) Int. Cl.[7] .............................................. H01H 37/04
(52) U.S. Cl. ...................................... 337/327; 337/417
(58) Field of Search ................................ 337/290, 327, 337/370, 380, 398, 417

(56) References Cited

U.S. PATENT DOCUMENTS

| | | | | |
|---|---|---|---|---|
| 3,015,954 A | * | 1/1962 | Daiglish ..................... | 374/116 |
| 4,124,793 A | * | 11/1978 | Colman ...................... | 219/523 |
| 4,362,403 A | * | 12/1982 | Mooney ........................ | 374/4 |
| 4,698,488 A | * | 10/1987 | Kishimoto .................. | 219/549 |
| 4,835,981 A | | 6/1989 | Rinholen ..................... | 62/229 |
| 4,890,492 A | * | 1/1990 | Andrejasich et al. ......... | 73/292 |
| 4,969,749 A | * | 11/1990 | Hasselmann ................ | 374/115 |
| 5,637,794 A | * | 6/1997 | Hanisko ....................... | 73/121 |
| 5,652,826 A | | 7/1997 | Mills ........................... | 392/376 |
| 5,889,460 A | * | 3/1999 | Bachmann et al. ........... | 338/28 |
| 6,431,750 B1 | * | 8/2002 | Haberbusch et al. ........ | 374/166 |
| 6,487,904 B1 | * | 12/2002 | Myhre ..................... | 73/204.12 |
| 6,550,963 B2 | * | 4/2003 | Daily et al. ................. | 374/179 |
| 2003/0156621 A1 | * | 8/2003 | McWilliams ................ | 374/149 |

* cited by examiner

*Primary Examiner*—Anatoly Vortman
(74) *Attorney, Agent, or Firm*—Nawrocki, Rooney & Sivertson, P.A.

(57) ABSTRACT

A temperature detection and switching assembly comprising a solid state low temperature cut-out, operatively linkable to a remote controller, is provided. Preferably, the solid state low temperature cut-out comprises a plurality of spaced apart programmable temperature switches supported by an elongate flexible substrate. An elongate, flexible yet rugged casing is further provided for housing the solid state low temperature cut-out, as is a mounting fixture comprising a fitting, for receiving the casing, a flange extending therefrom, and a gasket for sealing between the flange and a mounting surface.

9 Claims, 6 Drawing Sheets

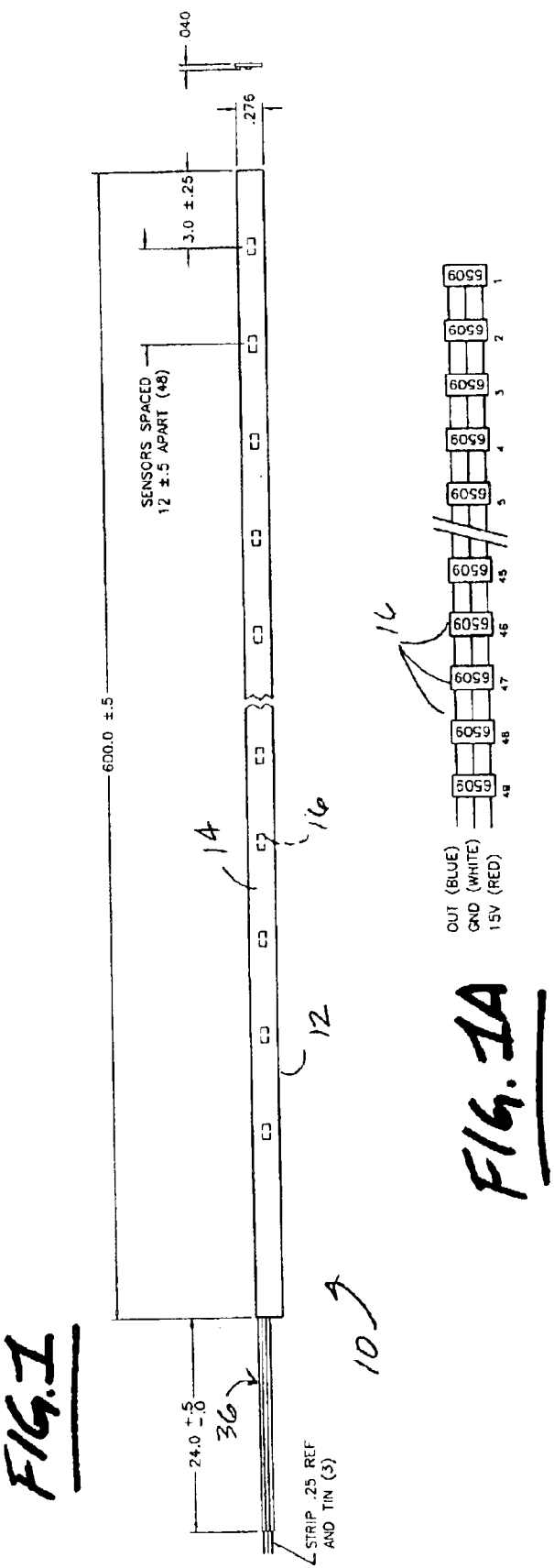

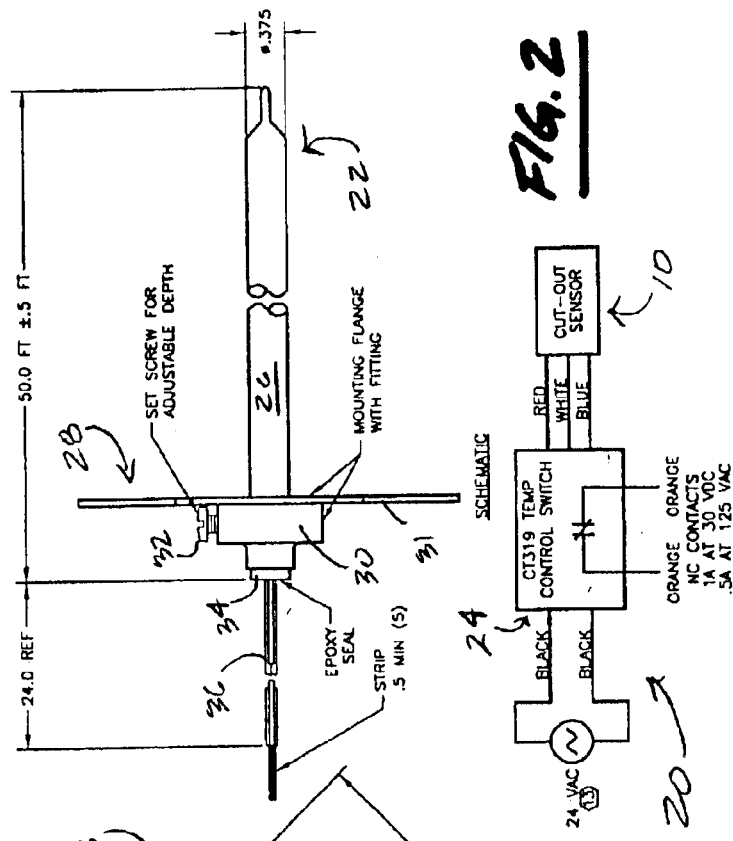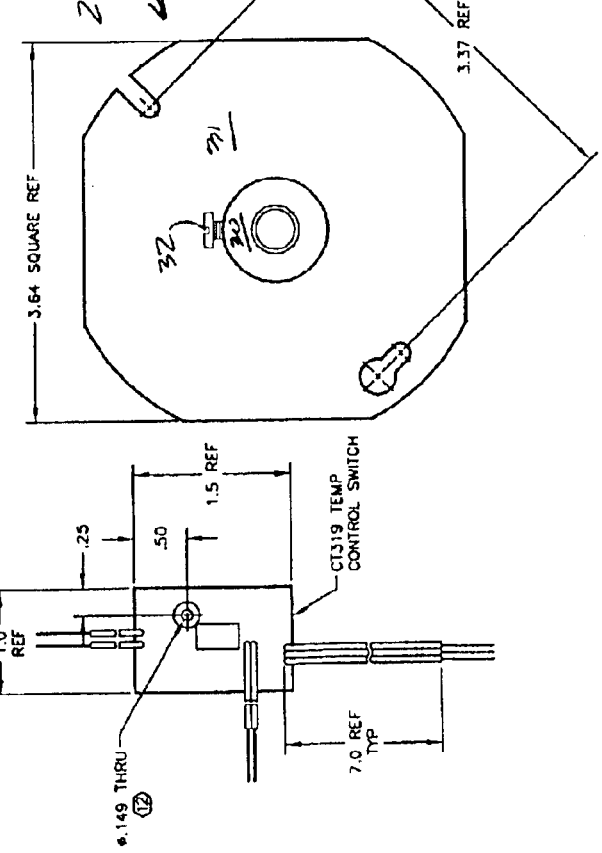

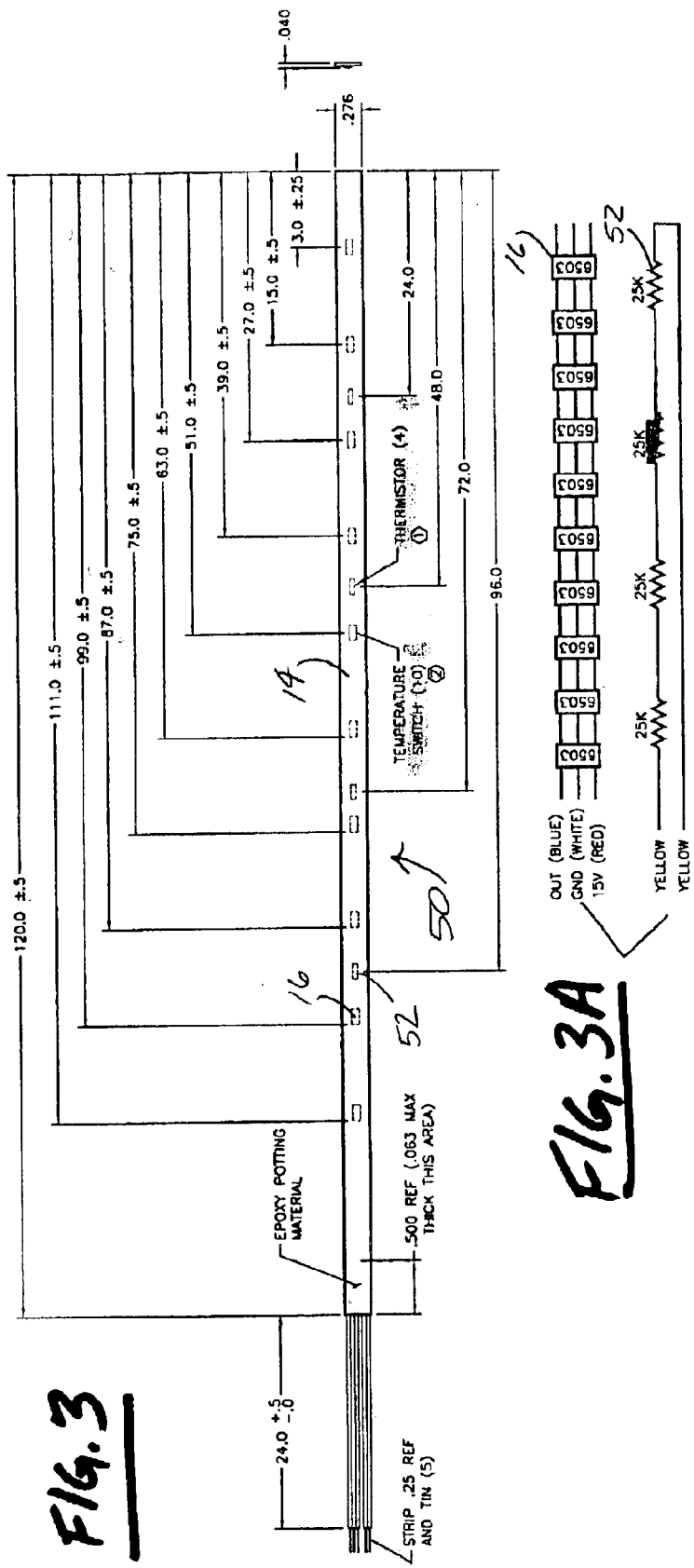

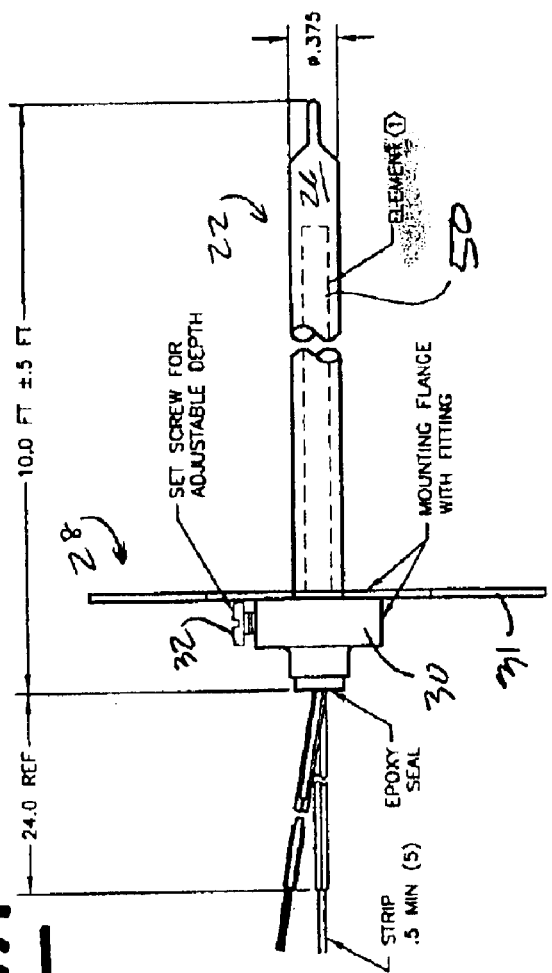
FIG. 4A
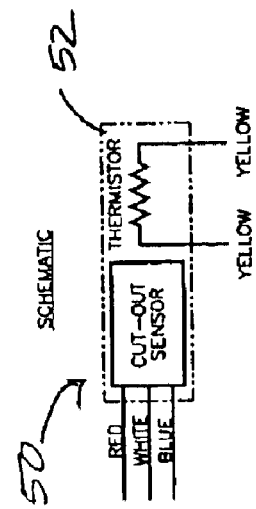
FIG. 4
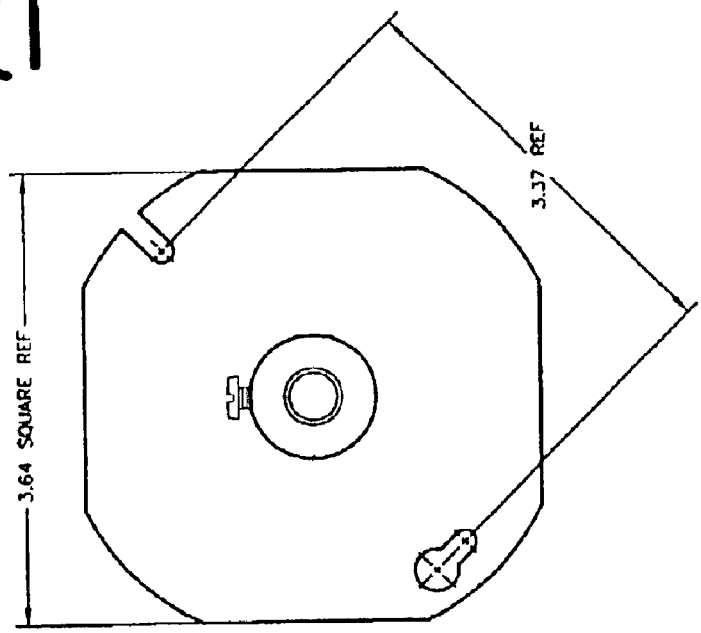

TEMPERATURE DETECTION AND SWITCHING ASSEMBLY

This is a regular application filed under 35 U.S.C. §111(a) claiming priority under 35 U.S.C. §119(e)(1), of provisional application Ser. No. 60/343,989, having a filing date of Jan. 2, 2002, filed under 35 U.S.C. §111(b).

TECHNICAL FIELD

The present invention generally relates to temperature detection and switching resulting from said detection, more particularly to a temperature detection and switching assembly comprising a solid state low temperature cut-out for operative linkage to a controller.

BACKGROUND OF THE INVENTION

Temperature switches (i.e., thermostats, aquastats or freezestats) are commonly used in direct digital control systems to provide a digital input when a monitored process temperature rises/falls to a preselected value. Equipment protection, for example, from the overcooling or icing of hydronic coils, cooling coils and liquid handling pipes, has long been recognized, with a variety of known temperature switches available, selection being based upon the specific application. Heretofore known temperature switches employ a variety of known operating principals, such as for instance, bimetallic, fluid thermal expansion, freezestat and electronic.

The freezestat is commonly used to prevent water or steam coils in air handling units from freezing. Functionally, a fluid, existing as a saturated vapor at the switch set point temperature, is confined within a long capillary tube, or what is sometime referred to as a bulb. The tube is installed in a serpentine fashion over the area of the air stream to be monitored. If any point along the tube falls below the saturation temperature of the capillary fluid, condensation commences, which in turn causes a rapid, almost instantaneous change in system pressure, which actuates a switch in response thereto.

Several significant drawbacks are inherent to freezestats (i.e., gas-filled capillary switching devices). First, the gas-filled capillaries must, in order to be functional, be mounted in a horizontal orientation (i.e., only sections having a substantially horizontal orientation are functional: bending of the capillary tube is limited, e.g., bends should not have a radius of less than about 1.5 inches). This is inherently problematic, and is especially so when a large area must be traversed: the labor associated with the installation of a 30 foot plus capillary, or a plurality of such devices is quite time consuming.

Second, the relay portion is characteristically mounted (i.e., permanently mounted) to the capillary. This necessitates that the capillary be completely uncoiled, and subsequently feed through a small mounting hole, and then serpentinely configured so as to traverse the area requiring monitoring.

Third, the capillary tubes, especially those of small diameter, are notoriously fragile. Any kinks, pinholes, etc. render such devices inoperable.

Fourth, freezestats have a limited vapor charge, typically having a liquid volume less than the volume associated with a twelve inch length of the capillary or bulb. Thus, such capillary tubes have a sensitivity of twelve inches (i.e., temperature detection in any twelve inch continuous length of bulb).

Finally, if the thermostat bellows is colder than the capillary, the charge accumulates in the bellows, and the case temperature controls the action of the thermostat rather than the capillary temperature. Thus, the relay portion of the switch assembly must be mounted in an environment warmer than the capillary to properly function.

In light of the foregoing real and/or perceived shortcomings in the art, it is commercially advantageous to provide a temperature detection and switching assembly having improved sensitivity, greatly reduced installation effort, greater operational flexibility (e.g., no limitation on sensor orientation, no restriction on controller placement, etc.), and improved durability.

SUMMARY OF THE INVENTION

A temperature detection and switching assembly comprising a solid state temperature cut-out, operatively linkable to a controller, is provided. Preferably, the solid state temperature cut-out comprises a plurality of spaced apart resistor temperature switches, supported by an elongate flexible substrate. An elongate, flexible yet rugged casing is further provided for housing the solid state temperature cut-out, as is a mounting fixture comprising a fitting, for receiving the casing, a flange extending therefrom, and a gasket for sealing between the flange and a mounting surface. The subject solid state temperature cut-out may further, and optionally, include a plurality of thermistors supported by the substrate in furtherance of temperature averaging, and/or may include a temperature sensor (e.g., a resistance temperature detector).

In an alternate embodiment, the temperature detection and switching assembly comprises a solid state temperature cut-out, and an integral controller operatively linked thereto. More particularly, a casing, having a base and elongate body, is further provided, the cut-out being receivable in the casing body, the controller being receivable in the casing base. Thus, a unitary, solid state element is provided in furtherance of temperature detection and switching, an element having particularly utility in freeze protection of air handling units.

More specific features and advantages obtained in view of those features will become apparent with reference to the drawing figures and DETAILED DESCRIPTION OF THE INVENTION.

BRIEF DESCRIPTION OF THE DRAWINGS

FIG. 1 depicts an integrated circuit thermometer (e.g., cut-out) of the subject switch assembly;

FIG. 1A depicts select details of FIG. 1;

FIG. 2 is a schematic of a temperature sensing and detection assembly using the cut-out of FIG. 1;

FIG. 2A illustrates a bendable temperature sensor of the assembly of FIG. 2;

FIG. 2B is an end view of the mounting fixture of the bendable temperature sensor of FIG. 2A;

FIG. 3 depicts an alternate embodiment of the integrated circuit thermometer of the subject switch assembly, more particularly a cut-out in combination with a thermistor;

FIG. 3A depicts select details of FIG. 3;

FIG. 4 is a schematic of a temperature sensing and detection assembly using the integrated circuit thermometer of FIG. 3;

FIG. 4A illustrates a bendable temperature sensor incorporating the integrated circuit thermometer of FIG. 3;

DETAILED DESCRIPTION OF THE INVENTION

Figure 2C:
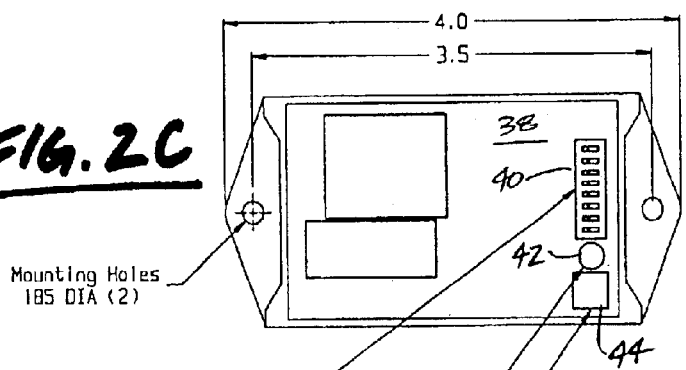
FIGS. 2C–2E are front, back and end views of the controller of the assembly of FIG. 2.

The subject temperature detection and switching assembly 10 critically comprises an integrated circuit thermometer 12 (e.g., a low temperature cut-out with spot sensing), as shown in FIGS. 1 & 1A. The integrated circuit thermometer, or thermal ribbon 12, is characteristically solid state, and preferably, but not necessarily, a low temperature cut-out (i.e., emulating a freezestat functionality). The thermal ribbon 12 generally comprises an elongate flexible substrate 14 and a plurality of spaced apart temperature switches 16 supported by same. Preferably, the temperature switches 16 comprise resistor programmable temperature switches, however, functionally equivalent circuitry, including non-programmable temperature switches, may be readily substituted as is known and practiced, or practicable, in the art. More particularly, the resistor programmable temperature switches of the subject thermal ribbon are produced by Maxim Integrated Products, Sunnyvale, Calif., (e.g., Maxim 6509). The thermal ribbon of FIG. 1 has an operating range of 0–105° C. (32–221° F.), AWG #26, stranded, TFE insulated leads, and, polyester insulation material with electrically insulating tape. The unit is sensitive to low temperature within any six inch segment, and fully functional while mounted in any orientation, in contradistinction to remote bulb thermostats and the like, which are only operable in a substantially horizontal orientation.

Referring now to FIG. 2, there is depicted a schematic of a temperature sensing and detection assembly 20 using the cut-out sensor 12 of FIG. 1. In addition to the cut-out sensor 12, the subject assembly 20 generally includes an elongate flexible casing 22 for housing the solid state low temperature cut-out 12, and a controller 24 to which the cut-out sensor 12 is operatively linked, as will be subsequently discussed.

Referring now generally to FIGS. 2A & 2B, the elongate flexible casing 22 for housing the solid state low temperature cutout 12 is generally shown. The casing 22 includes a elongate body 26 for receiving and housing the cut-out sensor 12, and a mounting fixture 28. The casing body 26 preferably is of aluminum construction having a minimum bend radius of 3 inches. With regard to the sensing unit of FIGS. 2–2B, the casing body is most likely to have a length in the range of about 5–50 feet, and a diameter of about 0.375 inches so as to accommodate the sensor of FIG. 1 which likewise has a likely or preferred length of about 5–50 feet. As may be readily appreciated, casing material and dimensions are primarily a function of the cut-out sensor, or more broadly, are a dependent upon the temperature sensing/switching objectives for a given application.

The mounting fixture 28 of the casing 22 generally includes a fitting 30 from which preferably extends a flange 32, and a gasket (not shown) for sealing between the mounting flange and the mounting surface. The body 26 of the casing 22 is slidingly received within the fitting 30 of the mounting fixture 28 as shown (FIG. 2A), a set screw 32, or other mechanical interface, provided to selectively unite the subject casing components. The flange 31 of the fixture 28 is preferably a standard octagonal mounting cover plate of galvanized steel, the fitting thereof preferably being an aluminum construct. An epoxy seal 34 is provided at a proximal end of the casing 22, leads 36 of the cut-out sensor 12 extending therefrom for integration with, for instance, the controller as shown in the schematic of FIG. 2.

The temperature control switch has a power requirement of 24 volts AC +/−5 volts. As to switching temperature, the contacts open at/below 41° F. (5° C.), typical, with the following operating temperature ranges: −50–221° F. (−45.5–105° C.) for the cut-out, and 32–122° F. (0–50° C.) for the temperature control switch. The leads are AWG #26 stranded TFE insulated and AWG #24 PVC insulated for the cut-out and temperature control switch respectively, with the sensor insulation resistance being 10 megohms minimum at 100 volts DC, leads to sensor housing.

Figure 2E:
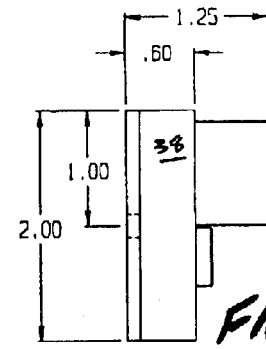
Figure 2D:
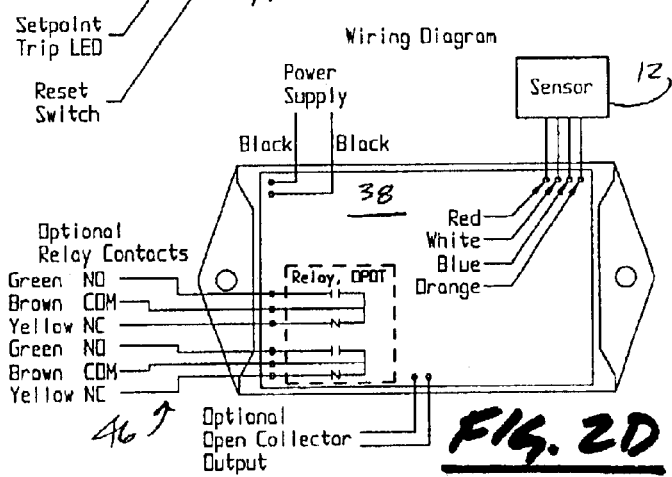

Referring now to FIGS. 2C–2E, the controller 24, suitable for inclusion in an assembly of the subject invention, is shown, more particularly the housing 38 is shown in front, back, and side and views respectively. The controller requires 24 volts, +/−5 volts AC from an external source, with a relay contact rating of 1 amp at 30 volts DC, 0.5 amps at 125 volts AC.

The controller includes a variety of features, and may be especially configured to accommodate a variety of applications and conditions. For instance, as shown with respect to FIGS. 2C and 2D, the controller 24 preferably includes an eight position dip-switch 40 for accommodating select temperature set points, a set point trip LED 42, a reset switch 44, and optional relay contacts 46 corresponding to a double pole double throw (DPDT) relay. The temperature set points are adjustable from 30 to 44° F., in 2° increments, with accuracy +/−0.9° F. (+/−0.5° C.) typical. Ambient operational temperatures are from about 32–122° F. (0–50° C.), with ambient storage temperatures ranging from about −40–185° F. Input power is 85–265 volts AC, 24 volts AC, or 14–60 volts DC. As to outputs, the DPDT relay is 8 amps at 240 volts AC, 0.25 HP, with the transistor being an open collector capable of sinking 50 milliamps. The housing is preferably an epoxy sealed nylon construct.

Referring now to FIGS. 3, 3A, and 4, there is shown a integrated circuit thermometer 50 (i.e., low temperature cut-out with temperature averaging) having a plurality of temperature switches 16 in combination with numerous thermistors 52. The subject temperature detection and switching assembly preferably, but not necessarily, utilizes Maxim 6503 temperature switches in combination with a thermistor set, the thermistors thereof having a 100,000 ohm resistance at 25° C., R25° C./R125° C.=29.25, and an interchangeability of +/−0.2° C. at 25° C. The sensor housing as shown in FIG. 4A greatly resembles that shown in FIG. 2A, deviations therebetween being primarily attributable to the added functionality of the subject thermal ribbon. With no or little modification, the subject sensing unit is readily utilized with the controller of FIGS. 2C–2E to provide thermal protection of heating or cooling coils in HVAC equipment such as air handlers or unit ventilators.

Figure 5B:
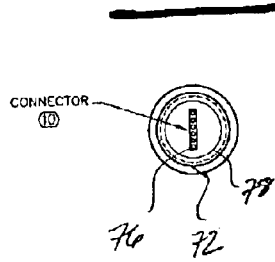
FIG. 5 depicts an alternate embodiment of the integrated circuit thermometer of the subject switch assembly, more particularly a cut-out in combination with an RTD, the controller being integral to the integrated circuit thermometer.
FIG. 5A illustrates a bendable temperature sensor incorporating the integrated circuit thermometer of FIG. 5, the controller being integrally housed therewith; and, FIG. 5B illustrates an end view of the sensor of FIG. 5A, more particularly a pin connector for same.
Figure 5A:
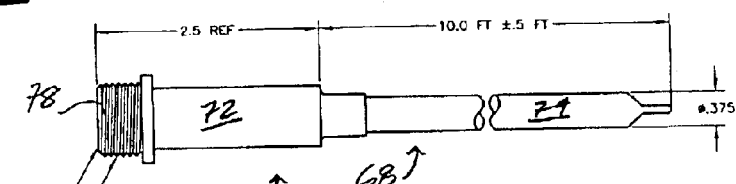
Figure 5:
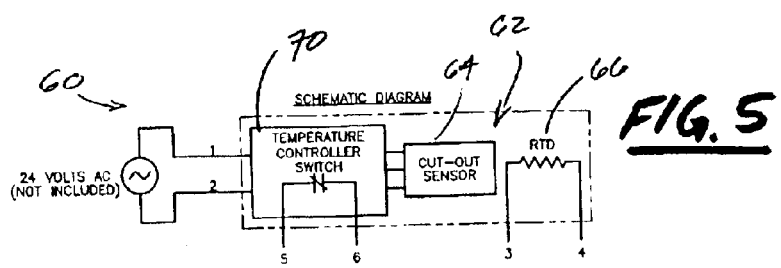

Referring now generally to FIGS. 5–5B, a temperature detection and switching assembly 60 is show as a fully integrated, unitary construct. The integrated circuit thermometer 62, as shown, includes a cut-out sensor 64, as previously discussed, in combination with an RTD averaging element 66. It should be readily appreciated that the exclusion, inclusion, and/or substitution of further/alternate thermal sensing, indicating, or switching elements is contemplated.

With specific reference to FIGS. 5A and 5B, the casing 68 for housing both the thermal ribbon 62 and the controller 70 includes a base 72 (i.e., a fitting) from which extends an elongate body 74. The thermal ribbon 62 is generally operably received within the body 74 of the casing 68, with the controller portion 70 of the assembly 60 operably received (i.e., packaged) within the base 72. The assembly 60 is operably interfaced with, for example, a power source, motors, etc., via a pin connector 76 (i.e., the assemble includes, at a terminal end thereof, a six pin connector as shown in FIG. 5B). Mechanical integration is accomplished via the casing 68 which is generally adapted to be fixedly engagable with a mounting surface, as for instance, via the inclusion of a threaded male fitting 78 or the like.

It would be apparent to those skilled in the art that the configurations and parameters may be varied slightly to accomplish similar functions without deviating from the scope and intent of this invention. For instance, in addition to the temperature switching aspects of the subject invention, the assembly may be readily adapted to indicate temperature at select points along the thermal ribbon via incorporation of, for example, a platinum resistance temperature detector.

The subject invention disclosure provides specific assembly functionality (i.e., performance), and a discussion of the component configurations associated therewith, all of which achieve an objective of improved switch sensitivity, truly remote placement of a controller, and sensor orientation freedom. There are other variations of this invention which will become obvious to those skilled in the art, via the substitution of known components in new ways to achieve a variety of switching solutions. It will be understood that this disclosure, in many respects, is only illustrative. Changes may be made in details, particularly in matters of shape, size, material, component selection, and arrangement of parts without exceeding the scope of the invention.

Accordingly, the scope of the invention is as defined in the language of the appended claim.

What is claimed is:

1. A temperature detection and switching assembly comprising a solid state low temperature cut-out for operative linkage to a controller, said solid state low temperature cut-out comprising an elongate flexible substrate and a plurality of spaced apart temperature switches supported by said substrate, said temperature switches comprising programmable temperature switches.

2. The assembly of claim 1 further comprising a plurality of thermistors, said thermistors supported by said substrate.

3. The assembly of claim 2 further comprising a temperature sensor, said sensor housed within said casing.

4. The assembly of claim 3 wherein said temperature sensor comprises a platinum resistance temperature detector.

5. The assembly of claim 1 further comprising a temperature sensor, said sensor housed within said casing.

6. The assembly of claim 5 wherein said temperature sensor comprises a platinum resistance temperature detector.

7. A temperature detection and switching assembly comprising a solid state low temperature cut-out for operative linkage to a controller, an elongate flexible casing for housing said solid state low temperature cut-out, and a mounting fixture for securing said casing, said solid state low temperature cut-out comprising an elongate flexible substrate and a plurality of spaced apart temperature switches supported by said substrate, said mounting fixture including a fitting, said casing being slidingly receivable therein.

8. The assembly of claim 7 wherein said mounting fixture further includes a flange extending from said fitting.

9. The assembly of claim 8 wherein said mounting fixture further includes a gasket, said gasket sealing between said flange and a mounting surface.

* * * * *